United States Patent
Hsieh

(10) Patent No.: US 9,488,212 B2
(45) Date of Patent: Nov. 8, 2016

(54) DUST PROOF STRUCTURE FOR STRESS-SENSIBLE SCREW

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 84 days.

(21) Appl. No.: 14/602,293

(22) Filed: Jan. 22, 2015

(65) Prior Publication Data

US 2015/0247521 A1 Sep. 3, 2015

(30) Foreign Application Priority Data

Mar. 3, 2014 (TW) .............................. 103203599 U

(51) Int. Cl.
*F16B 31/02* (2006.01)
*F16B 35/00* (2006.01)
*G01L 5/24* (2006.01)
*H04Q 9/00* (2006.01)

(52) U.S. Cl.
CPC ................. *F16B 35/00* (2013.01); *G01L 5/24* (2013.01); *H04Q 9/00* (2013.01); *H04Q 2209/40* (2013.01); *H04Q 2209/80* (2013.01)

(58) Field of Classification Search
CPC .... F16B 1/0071; F16B 31/02; F16B 31/025; F16B 31/028; F16B 35/00; G01L 5/24; H04Q 2209/40; H04Q 2209/80
USPC .................................................... 411/8, 9, 14
See application file for complete search history.

(56) References Cited

U.S. PATENT DOCUMENTS

| | | | |
|---|---|---|---|
| 2,600,029 A * | 6/1952 | Stone .................... | F16B 31/025 338/2 |
| 3,943,819 A * | 3/1976 | Charron .................... | G01L 5/24 411/14 |
| 4,553,124 A * | 11/1985 | Malicki ................. | F16B 31/025 338/2 |
| 4,630,490 A * | 12/1986 | Malicki ..................... | G01L 1/22 338/5 |
| 4,760,740 A * | 8/1988 | Meisterling ............ | G01N 29/28 269/21 |
| 4,823,606 A * | 4/1989 | Malicki ..................... | G01L 5/24 411/14 |
| 5,584,627 A * | 12/1996 | Ceney .................... | F16B 31/025 116/DIG. 34 |
| 6,204,771 B1 * | 3/2001 | Ceney .................... | F16B 31/025 250/559.19 |
| 6,501,211 B1 * | 12/2002 | Nasrollahzadeh .... | H01L 41/042 310/317 |
| 7,246,980 B2 * | 7/2007 | Azzalin .................. | F16B 41/005 292/327 |
| 7,412,898 B1 * | 8/2008 | Smith ....................... | G01L 5/24 73/761 |
| 7,441,462 B2 * | 10/2008 | Kibblewhite ........... | F16B 31/02 73/761 |
| 7,520,174 B2 * | 4/2009 | Clarke .................. | F16B 31/025 411/8 |
| 7,958,614 B2 * | 6/2011 | Popenoe ............... | F16B 31/025 29/446 |
| 7,973,671 B2 * | 7/2011 | Cloutier ................. | F16B 31/021 116/200 |
| 8,177,464 B2 * | 5/2012 | Zendehroud .......... | F16B 31/025 411/8 |
| 8,695,432 B2 * | 4/2014 | Hsieh .................... | F16B 31/025 411/383 |
| 9,046,433 B2 * | 6/2015 | Hsieh ...................... | F16B 31/02 |

* cited by examiner

*Primary Examiner* — Roberta Delisle
(74) *Attorney, Agent, or Firm* — CKC Partners Co., Ltd.

(57) ABSTRACT

A dust proof structure for a stress-sensible screw is provided. The dust proof structure includes a sensing screw, a head, a dust proof boot and a displayer. The sensing screw includes a base and at least one exposed lead, and the exposed lead is located in the base and transmits a stress signal. The head includes a lead base, the head is fitted with the base, and the exposed lead is detachably connected to the lead base. The dust proof boot is disposed on the head, and sleeves a connecting portion between the lead base and the exposed lead. The displayer is electrically connected w the had for displaying the stress signal.

16 Claims, 6 Drawing Sheets

DUST PROOF STRUCTURE FOR STRESS-SENSIBLE SCREW

RELATED APPLICATIONS

The application claims priority to Taiwan Application Serial Number 103203599, filed on Mar. 3, 2014, which is herein incorporated by reference.

BACKGROUND

1. Technical Field

The present disclosure relates to a stress sensible screw that can sense instantaneous stress. More particularly, the present disclosure relates to a dust proof structure for the stress-sensible screw. The dust proof structure can prevent dust, oil or moisture from entering an electrical connection portion, thereby reducing an error of the stress signal.

2. Description of Related Art

A screw is a tool widely used for securely screwing two objects together. Concerning public safety issues becomes more and more emphasized, selecting proper screw is very important in the field of precision technology. Also, it is required to perform regular inspections on the stress applied to the screw. For example, a screw having precision stress is essential in the assembly of an air craft, a space ship, a bridge or a steel skeleton reinforced building. Even if the inspections on the stress of the screw pass during the assembly, there is no guarantee on the safety of the screw after the screw suffers surrounding variations, such as metal aging, vibration or metal fatigue.

A kind of stress sensing device has been developed to address the aforementioned issues. In the stress sensing device, a sensor, an operator and a displayer are typically disposed in the screw. However, the build-in sensor, operator and displayer significantly increase the manufacturing cost of a single screw. Furthermore, the displayer is fixed such that the readout of the displayer for torque cannot be viewed in certain angles, which limits the performance of the build-in displayer. Moreover, in case multiple portions need to be sensed, a large amount of high-priced screws is required. When the stress sensing device is applied in a specified environment (e.g. in an aircraft wing), its performance will also be limited concerning the requirements in surrouonding resistance or weight.

In view of the problem, another kind of stress sensing device is commercially available. The stress sensing device utilizes a sensing screw connected to an external displayer. However, in the stress sensing device, a connection portion between the sensing crew and the outer displayer is mostly likely affected by dust, oil or moisture, which changes a contact feature of the connection portion and results in an error of the sensed stress value.

SUMMARY

According to one aspect of the present disclosure, a dust proof structure for a stress-sensible screw is provided. The dust proof structure includes a sensing screw, a head, a dust proof boot and a displayer. The sensing screw includes a base and at least one exposed lead, the exposed lead is located in the base and transmits as stress signal. The head includes a lead base, the head is fitted with the base, and the exposed lead is detachably connected to the lead base. The dust proof boot is disposed on the head, and sleeves as connecting portion between the lead base and the exposed lead. The displayer is electrically connected to the head for displaying the stress signal.

According to another aspect of the present disclosure, a dust proof structure for a stress-sensible screw is provided. The dust proof structure includes a sensing screw, a bead, a dust proof boot and a displayer. The sensing screw is for sensing and transmitting a stress signal. The head is fitted with the sensing screw. The dust proof boot sleeves a connecting portion between the head and the sensing screw. The displayer is connected to the head for displaying the stress signal.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
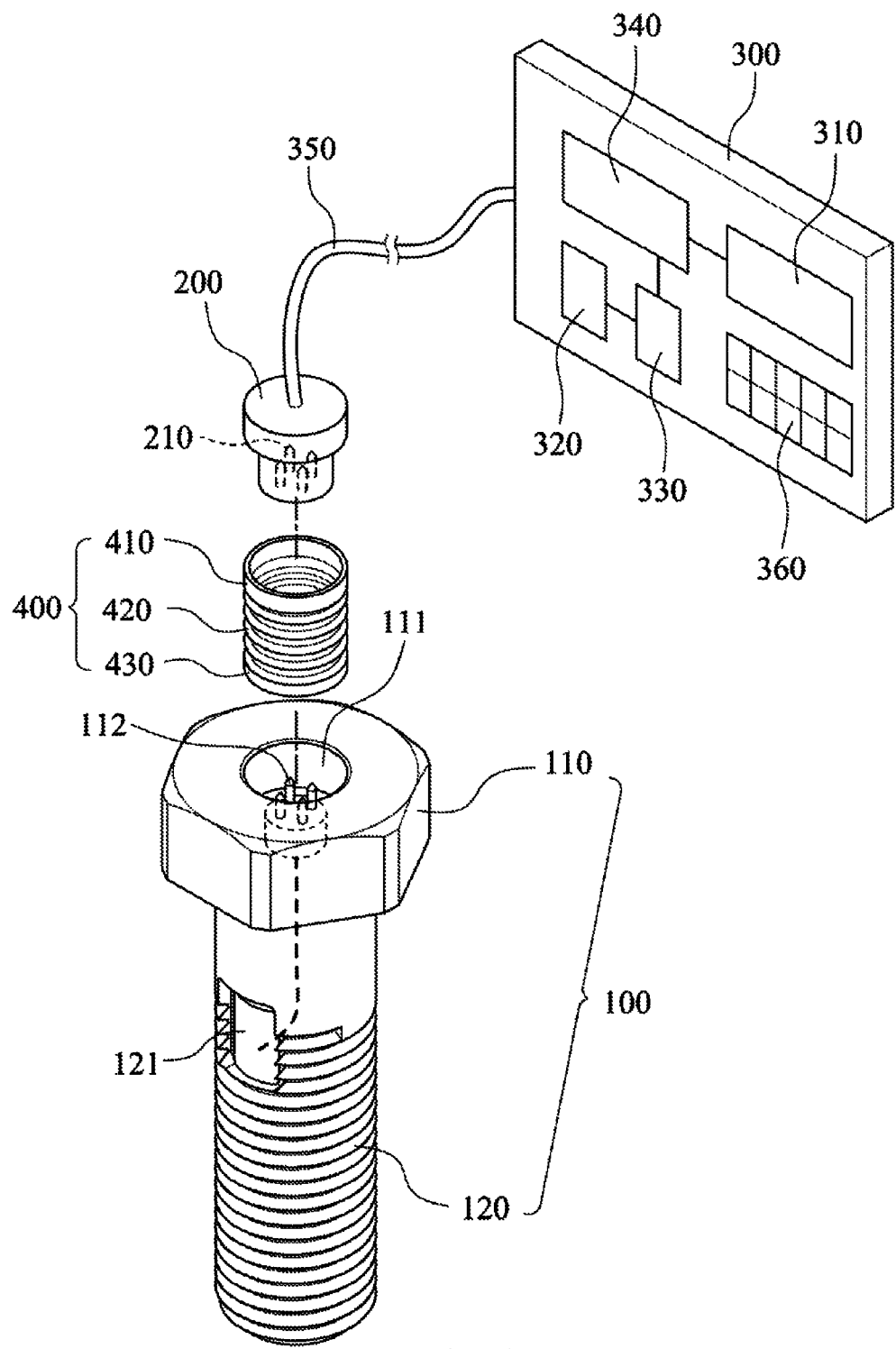
FIG. 1 is a perspective view showing a dust proof structure for a stress-sensible screw according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a perspective view showing a dust proof structure for a stress-sensible screw according to one embodiment of the present disclosure. The dust proof structure for the stress-sensible screw includes a sensing screw 100, a head 200, a displayer 300 and a dust proof boot 400.

The sensing screw 100 includes a head portion 110 and a thread portion 120, A stress sensing member 121 is disposed on the thread portion 120 for sensing the stress applied to the thread portion 120 and transmits a stress signal. A base 111 is disposed on the head portion 110. A plurality of exposed leads 112 is disposed On the base 111 and is axially protruded from a bottom of the base 111.

The head 200 is connected to the displayer 300 by a connecting wire 350, and a lead base 210 is disposed on the head 200. When the head 200 is fitted with the sensing screw 100, the exposed leads 112 on the base 111 is fitted with the lead base 210, and the stress signal transmitted by the sensing member 121 can be transmitted to the displayer 300 by the connecting wire 350.

The dust proof boot 400 includes a connecting portion 410, an expandable portion 420 and a withstanding portion 430. When the head 200 is fitted with the sensing screw 100, the connecting portion 410 of the dust proof boot 400 can be expanded relative to the base 111, and the withstanding portion 430 is contacted with a bottom of the base 111. In one example, the expandable portion 420 can be bellows shaped.

The displayer 300 includes a power supply 310, a signal transmitter 320, an analyzer 330, a displaying member 340 and a solar cell plate 360. The signal transmitter 320 transmits the stress signal to the analyzer 330. The analyzer no analyzes the stress signal and generates a stress value, and then the stress value is transmitted to the displaying member 340 by the analyzer 330. The stress value displayed on the displaying member 340 of the displayer 300 is an instantaneous stress value. The solar cell plate 360 generates an electric power by the sun-light, and provides the electric power to the power supply 310. The power supply 310 provides the electric power to the sensing member 121 on the sensing screw 100 by the connecting wire 350.

Figure 2:
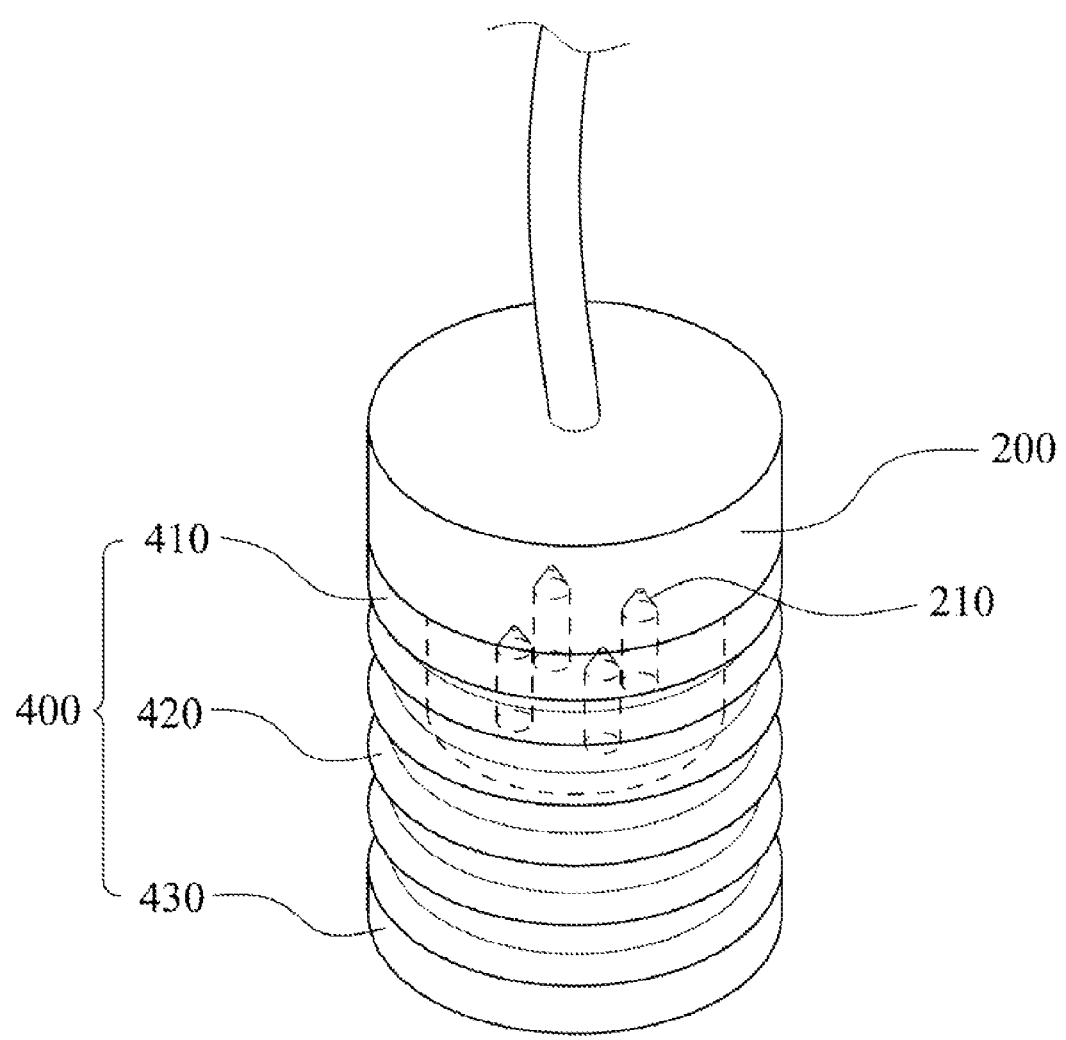
FIG. 2 is a side view showing a dust proof boot of FIG. 1 being connected with a head.

FIG. 2 is a side view showing the dust proof boot 400 of FIG. 1 being connected with the head 200. The dust proof boot 400 includes the connecting portion 410, the expandable portion 420 and the withstanding portion 430. The connecting portion 410 is connected to the head 200, thus the expandable portion 420 can sleeve the lead base 210. The withstanding portion 430 is connected to the expandable portion 420.

Figure 3A:
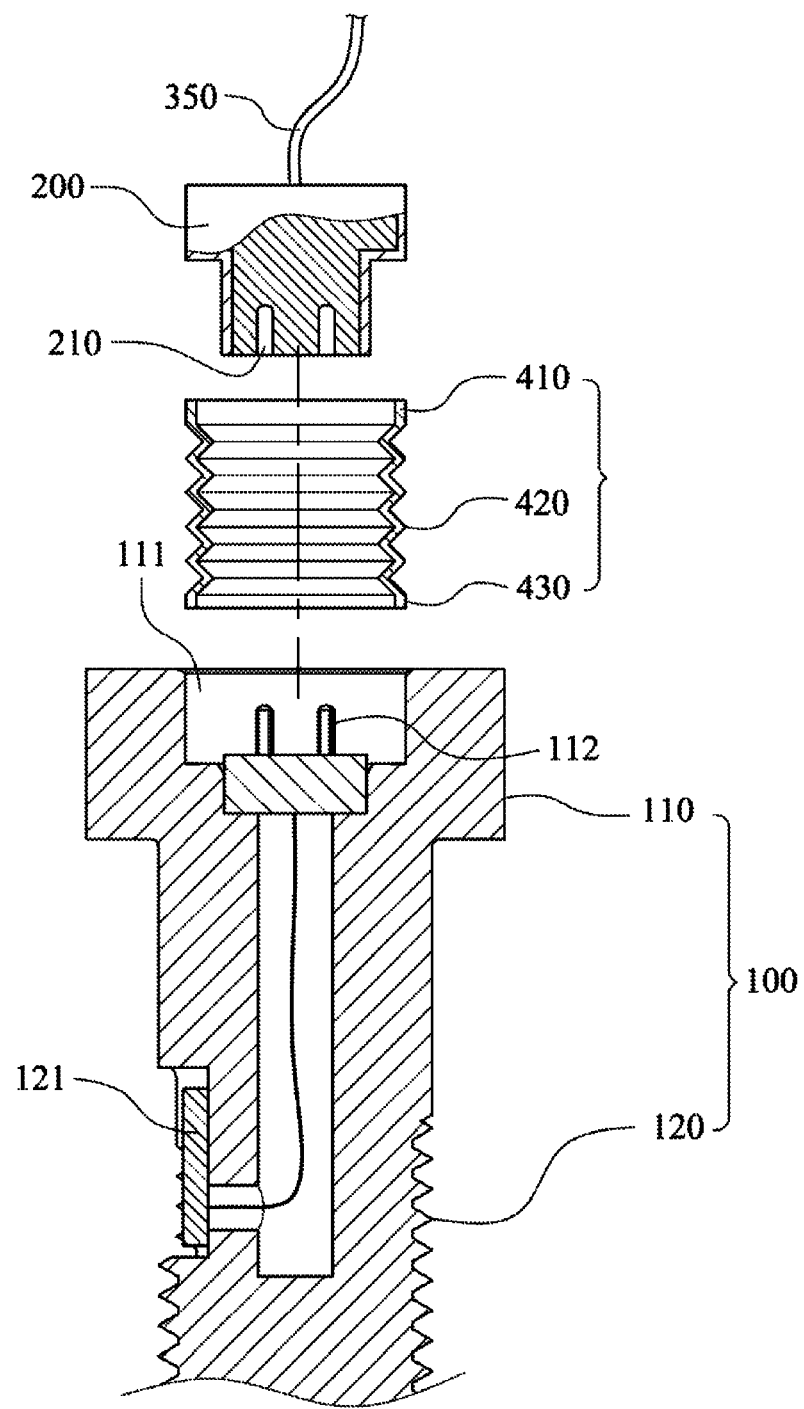
FIG. 3A shows that the base of FIG. 1 is dented.

FIG. 3A shows that the base 111 of FIG. 1 is dented. The stress sensing member 121 is disposed on the thread portion 120. The dented base 111 is disposed on the head portion 110. A plurality of exposed leads 112 is disposed on the dented base 111. The exposed leads 112 are electrically connected to the stress sensing member 121. The sensing member 121 senses the stress applied to the thread portion 120.

Figure 3B:
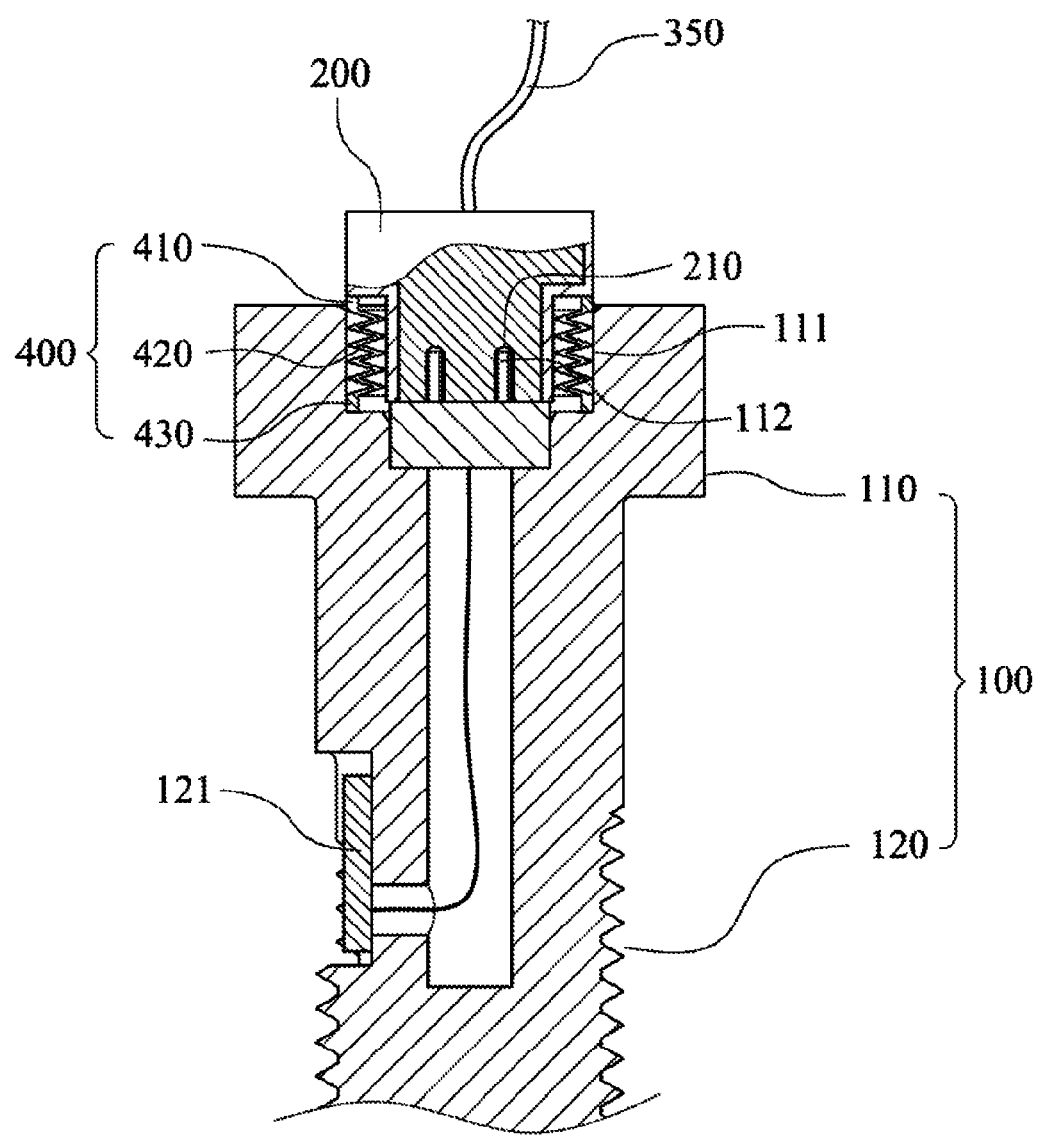
FIG. 3B shows that the head is connected with inside of the dented base of FIG. 3A.

FIG. 3B shows that the bead 200 is connected with inside of the dented base 111. When the head 200 is fitted with the sensing screw 100, the exposed lead 112 on the base 111 is fitted with the lead base 210 on the head 200, and the stress signal sensed by the sensing member 121 can be transmitted to the displayer 300 by the connecting wire 350. The expandable portion 420 of the dust proof boot 400 can be expanded relative to the base 111, and the withstanding portion 430 withstands a bottom of the base 111.

Figure 3C:
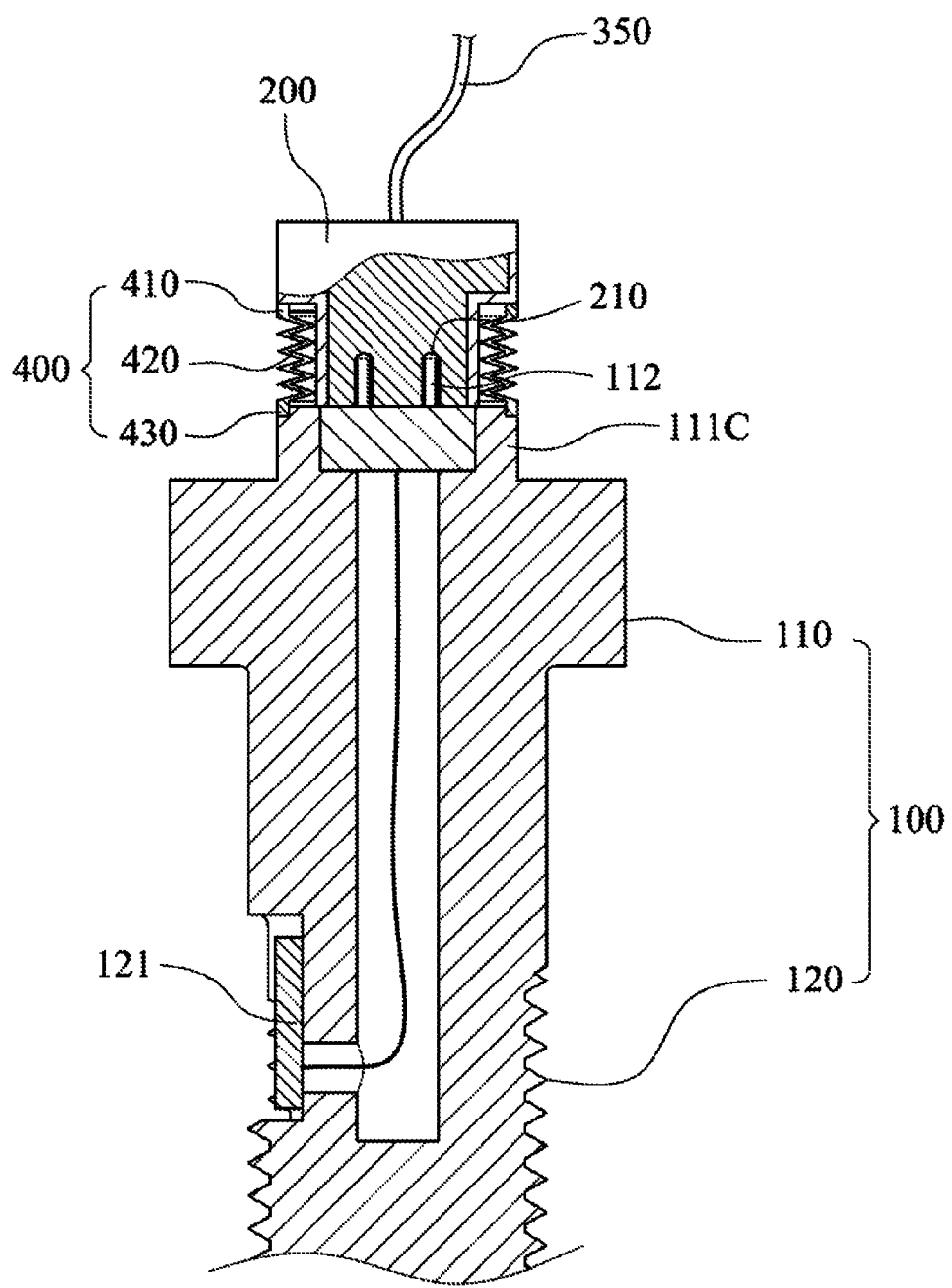
FIG. 3C shows that the head is connected with outside of a protruded base.

FIG. 3C shows that the base 111 is protruded, and the head 200 is connected with outside of a protruded base 111C. The stress sensing member 121 is disposed on the thread. portion 120. In one example, the base 111 is protruded, and forming a protruded base 111C. The protruded base 111C is protruded from the head portion 110. A plurality of exposed leads 112 is disposed on the protruded base 111C. The exposed leads 112 are electrically connected to the stress sensing member 121. The stress sensing member 121 senses the stress applied to the thread portion 120. When the head 200 is fitted with the sensing screw 100, the exposed lead 112 on the protruded base 111C are fitted with the lead base 210 on the head 200, and the stress signal sensed by the stress sensing member 121 can be transmitted to the displayer 300 by the connecting wire 350. The expandable portion 420 of the dust proof boot 400 can be expanded relative to the protruded base 111C, thus a connection portion between the exposed leads 112 and the lead base 210 can be sleeved, and the withstanding portion 430 is contacted a bottom of the protruded base 111C.

In the aforementioned FIGS. 3A to 3C, the stress signal is transmitted with the connecting wire 350. In another example, the stress signal can also be transmitted with the connecting wire 350.

Figure 4:
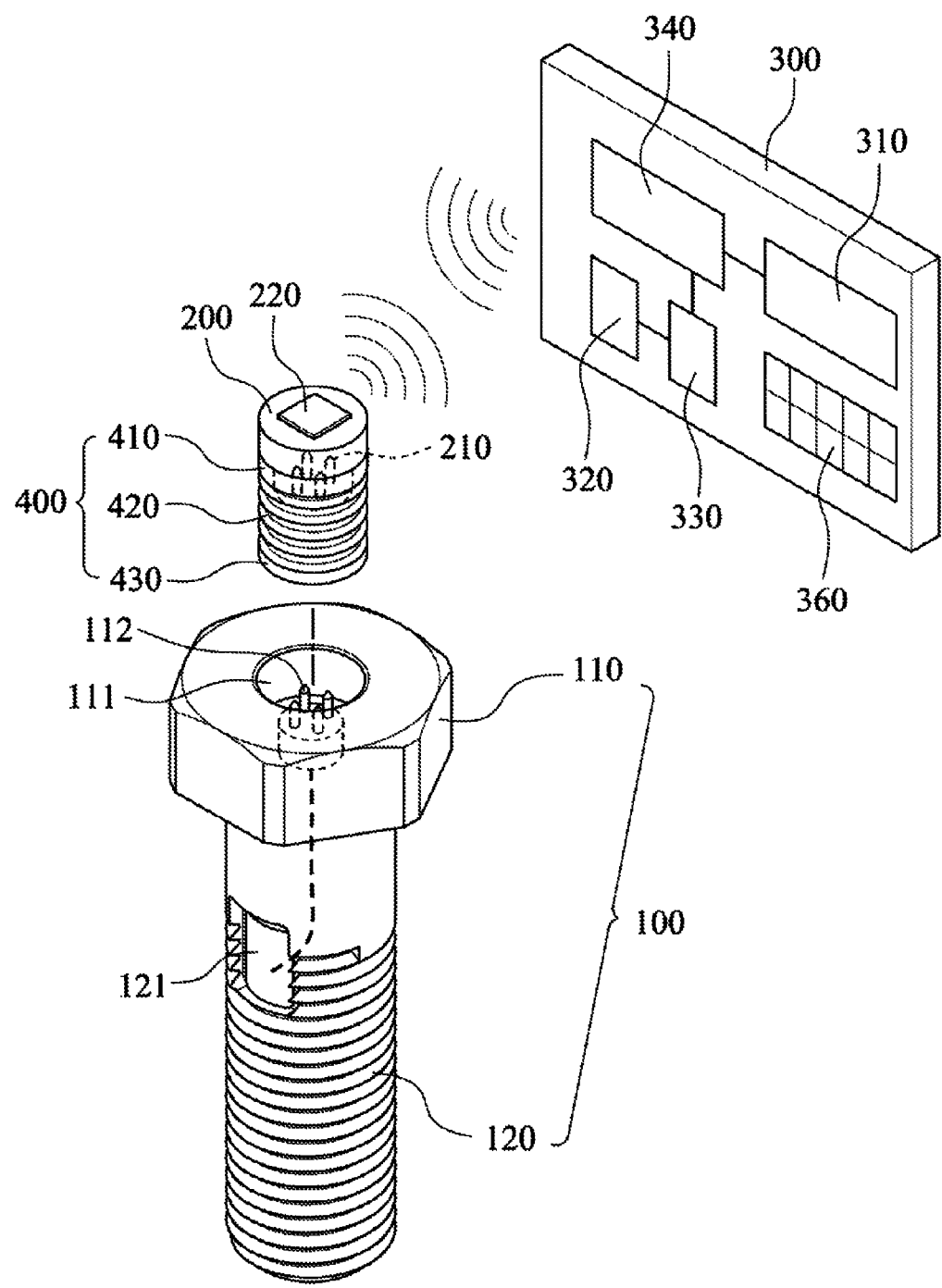
FIG. 4 is a perspective view showing that the head is wirelessly connected to the displayer of FIG. 1.

FIG. 4 is a perspective view showing that the head 200 is wirelessly connected to the displayer 300 of FIG. 1. In FIG. 4, the sensing screw 100 includes the head portion 110 and the thread portion 120. The stress sensing member 121 is disposed on the thread portion 120 for sensing the stress applied to the thread portion 120 and transmits the stress signal. The base 111 is disposed on the head portion 110, and a plurality of exposed leads 112 is disposed on the base 111.

A wireless transceiver 220, a dust proof boot 400 and a lead base 210 are disposed on the head 200. When the head 200 is fitted with the sensing screw 100, the exposed leads 112 on the base 111 are connected with the lead base 210 on the head 200, and the stress signal sensed by the stress sensing member 121 can be transmitted to the displayer 300 by the wireless transceiver 220. The dust proof boot 400 includes a connecting portion 410, an expandable portion 420 and a withstanding portion 430. The connecting portion 410 is connected to the head 200. When the head 200 is fitted with the sensing screw 100, the expandable portion 420 of the dust proof boot 400 can be expanded relative to the base 111, and the withstanding portion 430 withstands the bottom of the base 111, thus the connection portion between the exposed leads 112 and the lead base 210 can be sleeved. The wireless transceiver 220 can be wirelessly connected to the displayer 300 through an Infrared, a Bluetooth or a NFC.

The displayer 300 includes a power supply 310, a signal transmitter 320, an analyzer 330, a displaying member 340 and a solar cell plate 360. The signal transmitter 320 transmits the stress signal to the analyzer 330. The analyzer 330 analyzes the stress signal and generates a stress value, and then the stress value is transmitted to the displaying member 340 by the analyzer 330. The stress value displayed on the displaying member 340 of the displayer 300 is an instantaneous stress value. The solar cell plate 360 generates an electric power by the sun-light, and provides the electric power to the power supply 310. The power supply 310 provides the electric power to the sensing member 121 on the sensing screw 100 by the wireless transceiver 220.

The aforementioned sensing member 121 is a semiconductor structure such as an integrated circuit with MOSFET, owing to the tensile stress or the compressive stress will cause a recalibration of the electron mobility or the hole mobility in the semiconductor structure. The material of the MOSFET can be GRAPHENE, thus the characteristic can be enhanced. The shape of the aforementioned sensing member 121 can be a piece or a ring, and the stress sensing member 121 can be disposed on the thread portion 120.

The aforementioned head 200 can be connected to the displayer 300 with or without the connecting wire 350. One displayer 300 can be applied for sensing stress values between a plurality of sensing screws 100. Preferably, when the head 200 is wirelessly connected to the displayer 300, the stress values of the sensing screws 100 at some irregular angles or distances can also be sensed. Therefore, high convenience and high flexibility can be achieved.

An axial direction and a radial direction of the head 200 can be limited by the base 111, and thus the head 200 can be positioned.

In sum up, the dust proof structure for a stress-sensible screw of the present disclosure can prevent dust, oil or moisture from entering the head, thereby reducing the error of the stress signal and increasing the sensing accuracy of the stress. The dust proof structure for a stress-sensible screw further has advantages on rapid assembling and disassembling, high positioning and low cost. Moreover, through the wireless connection between the displayer 300 and the head 200, instantaneous stress value applied to the sensing screw can be obtained. Therefore, high convenience and high flexibility can be achieved, thereby simplifying the sensing process of a precision member.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided the fall within the scope of the following claims.

What is claimed is:

1. A dust proof structure for a stress-sensible screw, comprising:
   a sensing screw comprising a base and at least one exposed lead that is located in the base and transmits a stress signal;
   a head comprising a lead base and fitted with the base, wherein the exposed lead is detachably connected to the lead base;
   a dust proof boot disposed on the head and sleeving a connecting portion between the lead base and the exposed lead; and
   a displayer electrically connected to the head for displaying the stress signal;
   wherein the dust proof boot comprises a connecting portion, an expandable portion and a withstanding portion, and the connecting portion is connected to the head; when the head is fitted with the sensing screw. the expandable portion is expanded relative to the base, and the withstanding portion withstands a bottom of the base, thereby sleeving the exposed lead.

2. The dust proof structure of claim 1, wherein the head is detachably fitted with the base.

3. The dust proof structure of claim 1, wherein the base is protruded for being fitted with outside of the head or the base is dented for being fitted with inside of the head.

4. The dust proof structure of claim 1, wherein the expandable portion is bellows shaped.

5. The dust proof structure of claim 1, wherein the displayer is connected to the head by a connecting wire.

6. The dust proof structure of claim 1, wherein the displayer is wirelessly connected to the head.

7. The dust proof structure of claim 6, wherein the head further comprises a wireless transceiver.

8. The dust proof structure of claim 7, wherein the wireless transceivers is connected to the displayer through an Infrared, a Bluetooth or a NFC.

9. A dust proof structure for a stress-sensible screw, comprising:
   a sensing screw for sensing and transmitting a stress signal;
   a head fitted with the sensing screw;
   a dust proof boot sleeving a connecting portion between the head and the sensing screw; and
   a displayer electrically connected to the head for displaying the stress signal;
   wherein the dust proof boot comprises a connecting portion, an expandable portion and a withstanding portion, and the connecting portion is connected to the head; when the head is fitted with the sensing screw, the expandable portion is expanded relative to the base, and the withstanding portion withstands a bottom of the base, thereby sleeving the exposed lead.

10. The dust proof structure of claim 9, wherein the head is detachably fitted with the base.

11. The dust proof structure of claim 9, wherein the base is dented or protruded; when the base is dented, the head is connected with inside of the base, and when the base is protruded, the head is connected with outside of the base.

12. The dust proof structure of claim 9, wherein the expandable portion is bellows shaped.

13. The dust proof structure of claim 9, wherein the displayer is connected to the head by a connecting wire.

14. The dust proof structure of claim 9, wherein the displayer is wirelessly connected to the head.

15. The dust proof structure of claim 14, herein the head further comprises a wireless transceiver.

16. The dust proof structure of claim 15, wherein the wireless transceivers is connected to the displayer through an Infrared, a Bluetooth or a NFC.

* * * * *